No. 746,673. PATENTED DEC. 15, 1903.
G. R. CHEESMAN.
SLIDING JAW WRENCH.
APPLICATION FILED SEPT. 23, 1903.
NO MODEL.
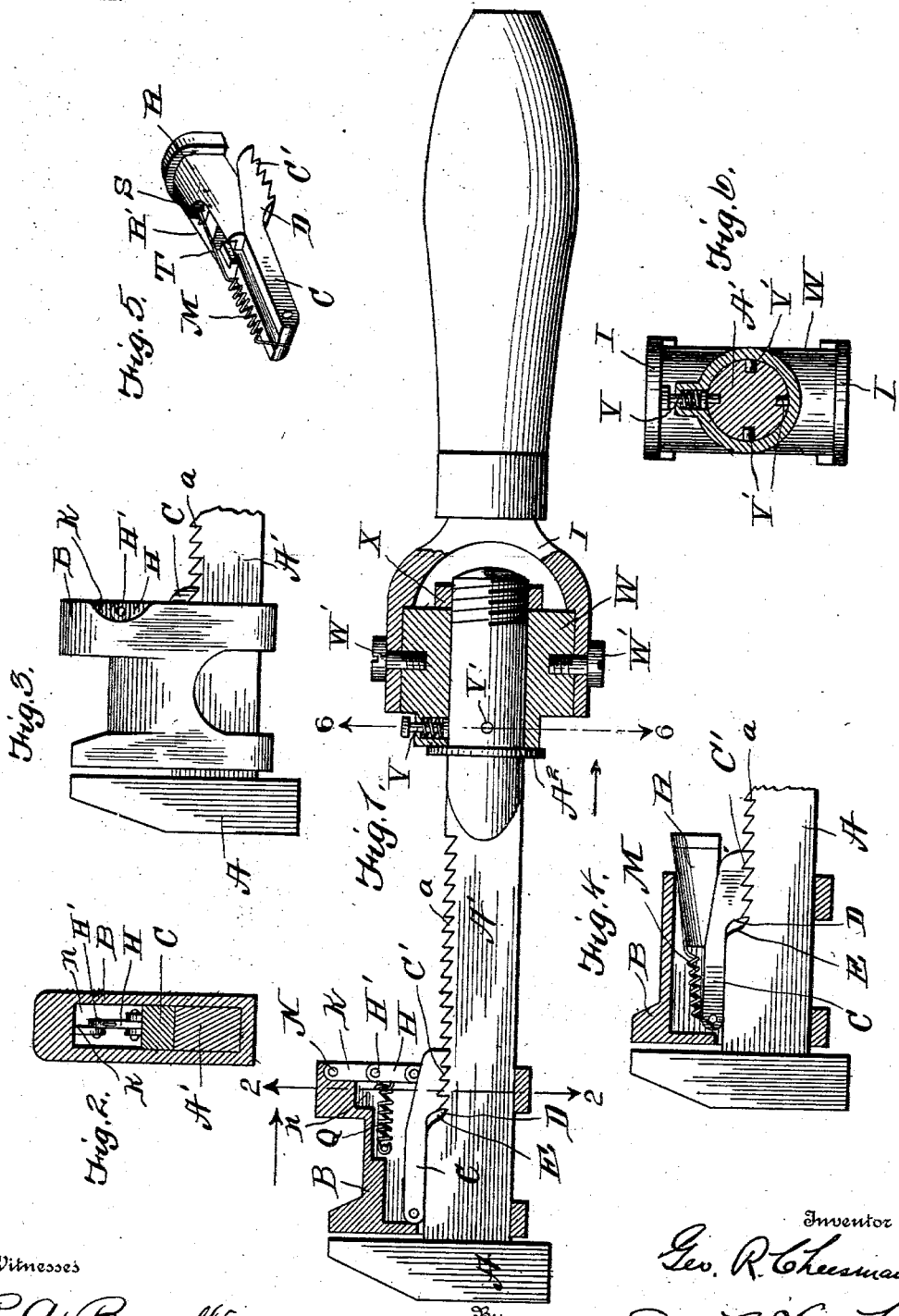
Witnesses
R. A. Boswell
Nellie K. Price
Inventor
Geo. R. Cheesman
By A. L. Hough
Attorney
THE NORRIS PETERS CO., PHOTO-LITHO., WASHINGTON, D. C.

No. 746,673.

Patented December 15, 1903.

UNITED STATES PATENT OFFICE.

GEORGE R. CHEESMAN, OF AUBURN, NEW YORK.

SLIDING-JAW WRENCH.

SPECIFICATION forming part of Letters Patent No. 746,673, dated December 15, 1903.

Application filed September 23, 1903. Serial No. 174,321. (No model.)

*To all whom it may concern:*

Be it known that I, GEORGE R. CHEESMAN, a citizen of the United States, residing at Auburn, in the county of Cayuga and State of New York, have invented new and useful Improvements in Sliding-Jaw Wrenches, of which the following is a specification.

This invention relates to new and useful improvements in wrenches, and especially in a wrench having a sliding jaw with a pivoted toothed dog having toggle-link connection with the movable jaw and so arranged that a spring secured to the toggle-links will normally throw the dog into engagement with the teeth on the shank portion of the fixed jaw, whereby the wrench may be set.

The invention consists, further, in the provision of a wrench having a movable jaw, to which is pivoted one end of a toothed dog, which is spring-actuated and normally held in engagement with the teeth on the shank of a fixed jaw and so constructed that when the spring is under tension the dog is drawn from engagement with the teeth of the shank portion of the fixed jaw to allow the movable jaw to be adjusted.

The invention consists, further, in the novel construction, combination, and adaptation of parts, as will be hereinafter more fully described and then specifically defined in the appended claims.

My invention is clearly illustrated in the accompanying drawings, which, with the letters of reference marked thereon, form a part of this application, and in which—

Figure 1 is a central longitudinal sectional view through my improved wrench. Fig. 2 is a cross-sectional view on line 2 2 of Fig. 1, the section being of the entire wrench. Fig. 3 is a side view of the jaws. Fig. 4 is a sectional view through the sliding jaw mounted upon the shank portion of the fixed jaw, showing a slightly-modified construction of means for actuating the dog. Fig. 5 is an enlarged detail view of the dog and the modified means for actuating the same, and Fig. 6 is a sectional view on line 6 6 of Fig. 1.

Reference now being had to the details of the drawings by letter, A designates a fixed jaw of a wrench having a shank portion A', with teeth $a$ on one edge thereof. B designates a sliding jaw mounted on the fixed shank portion A' and has pivotally connected thereto a dog C, one end of which has teeth C', adapted for engagement with the teeth $a$. Said dog is provided with a shoulder D, designed to fit over a shoulder E on the shank portion A' adjacent to its teeth $a$, and said dog has a limited swinging play in a chambered portion of the sliding jaw. Pivotally connected to the teeth-engaging end of said dog is a link H, which in turn is pivotally mounted on a pin H', to which a similar link K is pivoted. A pin N, carried by a projecting portion of the sliding jaw, has pivotally connected thereto the outer end of link K. Said links are so mounted that when in their normal positions they will be in alinement and within a recessed portion of the sliding jaw, as shown in the drawings. A spring Q is fastened at one end to a pin Q', carried by the movable or sliding jaw, and its other end is fastened to the pivotal pin, which connects the two links and serves to normally hold the links in such positions as to keep the teeth of the dog in engagement with the teeth on the shank portion of the fixed jaw.

As it is frequently desirable to use a wrench with the jaws held at different angles to the handle, I have shown a means for this adjustment, which consists in mounting the threaded end of the shank portion of the fixed jaw in a swiveled cylindrical member W, which is held to the forked end of the handle, which cylindrical member carries headed pins W', on which the arms of the jaw are pivotally mounted, said shank portion being of cylindrical form where it passes through said member and held in different positions by means of a spring-actuated pin V, which be may held in any one of the several circumferential apertures V' in said shank portion. A collar $A^2$ is formed integral with the shank portion of the fixed jaw, and between said collar and a nut X, fitted on the threaded end of the shank portion, said member is held in place. By means of this adjustment it will be readily seen that the shank portion of the fixed jaw may be held in various positions in order to adapt the tool for convenience in various kinds of work.

When it is desired to adjust the sliding jaw, the operator by pulling out on the inner pivotal ends of the links under the tension of the spring will cause the teeth engaging end of the dog to be drawn from the teeth of the shank of the fixed jaw, after which the movable jaw may be adjusted as may be desired.

In Figs. 4 and 5 I have shown a slight modification in which the dog, which is pivotally connected to the movable jaw, has a spring M fixed at one end to the inner end of the dog and its other end fastened to a sliding wedge-shaped member R. Said wedge-shaped member is channeled on its outer face, as at R', and carries a pin S in the walls of said recessed portion, to which pin S the spring M is connected. An integral flanged projection T rises from the rear face of the dog, and the flanged portion thereof travels in said recess, and the shank portion of said projection is adapted to move in the narrow slot through the bottom of the recess in said wedge-shaped member. A portion of the projection T is designed to normally rest in the inner end of the recess, which is housed, and by reason of the flange upon the wedge-shaped member the two parts are held securely together. In operation when it is desired to disengage the dog from the teeth of the shank portion of the fixed jaw the operator merely pulls out the projecting end of the wedge-shaped member, and the end of the spring M, which is fastened to the pivoted end of the dog, will cause the dog to tilt so that its teeth will disengage the teeth of the shank portion of the fixed jaw.

While I have shown a particular construction of wrench embodying the features of my invention, it will be understood that I may make alterations, if desired, in details of construction of the wrench without departing from the spirit of the invention.

Having thus described my invention, what I claim to be new, and desire to secure by Letters Patent, is—

1. A wrench comprising a fixed jaw with a serrated shank portion, a sliding jaw thereon, a toothed dog pivotally connected to said sliding jaw, toggle-links pivotally connecting the sliding jaw with said dog, and a spring connected at one end to the sliding jaw, and at its other end to said toggle-links, as set forth.

2. A wrench, comprising a fixed and a movable jaw, said fixed jaw having a series of serrations on one edge thereof, a dog, pivoted to the sliding jaw and having teeth for engagement with the serrations of said shank portion, a projection on the outer face of said dog, a link pivotally connected to said projection, a second link pivotally connected to the first-mentioned link and to the sliding jaw, and a spring fastened at one end to the sliding jaw, and its other end to the pin connecting said links, as set forth.

3. A wrench, comprising a fixed jaw with a serrated shank portion, a sliding jaw, a dog pivoted thereto, and having a shouldered portion engaging over a shoulder of said shank portion, and provided with teeth, a toggle-link connection between the outer end of the dog and the sliding jaw, and a spring fastened at one end to said sliding jaw, and its other end connected to the toggle-link joint, and designed to normally hold the links in alinement with each other and in a recess in the sliding jaw, as set forth.

4. A wrench comprising a fixed jaw, a sliding jaw mounted thereon, a dog carried by said sliding jaw, a toggle-link mechanism for throwing the dog into engagement with teeth on the shank portion of the fixed jaw, a hollow cylindrical member mounted upon the shank portion of the wrench, a handle pivoted to said member, and a spring-actuated pin carried by the latter and adapted to engage apertures in the circumference of said shank portion, as set forth.

In testimony whereof I have signed my name to this specification in the presence of two subscribing witnesses.

GEORGE R. CHEESMAN.

Witnesses:
   SIDNEY J. WESTFALL,
   CICERO J. HUME.